United States Patent

Lewis

[15] 3,705,440
[45] Dec. 12, 1972

[54] FOWL VENT REMOVAL APPARATUS AND METHOD

[72] Inventor: Ernest E. Lewis, Flowery Branch, Ga.

[73] Assignee: Gainesville Machine Company, Inc., Gainesville, Ga.

[22] Filed: Jan. 21, 1971

[21] Appl. No.: 108,316

[52] U.S. Cl. ................................................ 17/11
[51] Int. Cl. ........................................... A22c 21/06
[58] Field of Search ..................... 17/11, 52; 146/52

[56] References Cited

UNITED STATES PATENTS

| | | | |
|---|---|---|---|
| 2,943,346 | 7/1960 | Jensen | 17/11 |
| 2,590,785 | 3/1952 | Nealy | 17/11 |
| 1,766,824 | 6/1930 | Jones | 146/52 |
| 2,473,077 | 6/1949 | Starbuck, Jr. | 146/52 UX |

*Primary Examiner*—Lucie H. Laudenslager
*Attorney*—Newton, Hopkins & Ormsby

[57] ABSTRACT

A rotating means in the form of a power operated tool rotates an elongated spiral member relative to a tubular serrated cutting member. The spiral member has a sharp tapered outer end which extends beyond the cutting edge of the cutting member. The spiral member penetrates into the area of the fowl adjacent the vent thereof and produces a reaction force to urge such area of the fowl into engagement with the cutting member to make a circular cut in the tissue surrounding the vent so as to disconnect the vent from the surrounding tissue and thereby remove the vent of the fowl.

7 Claims, 3 Drawing Figures

PATENTED DEC 12 1972

3,705,440

INVENTOR
ERNEST E. LEWIS

BY: Newton, Hopkins, & Ormsby
ATTORNEYS

FOWL VENT REMOVAL APPARATUS AND METHOD

BACKGROUND OF THE INVENTION

The present invention relates to a method and apparatus for removing the vent of a fowl such as a chicken and the like. When chickens are processed, the feathers are first removed and the vent of the chicken is removed to form the initial step in the evisceration procedure for removing the entrails from the bird.

In the past, the vent of the fowl is removed by hand utilizing a knife or the like to make several cuts in the fowl in the area adjacent the vent. This type of manual cutting and removal of the vent is time consuming and does not provide uniform satisfactory results.

SUMMARY OF THE INVENTION

In the present invention, a rotating means is provided in the form of a power operated tool such as a drill of conventional construction. A particular advantage of the present invention is the fact that an ordinary electric tool can be readily modified according to the present invention for effectively removing a fowl vent.

The cutting means comprises a tubular serrated cutting member which is slightly larger in diameter than the fowl vent and is detailed to be attached to a stationary part of the support tool. A reaction member in the form of an elongated spiral member is provided with a sharp tapered out end which extends beyond the cutting edge of the cutting member. A portion of the spiral member extends through the cutting member and is attached to a spindle secured in the chuck of the tool.

During operation of the apparatus of the present invention the reaction means is rotated relative to the cutting member. The cutting member is positioned at the outer surface of the fowl in the area adjacent the vent thereof and the spiral reaction member penetrates into the skin of the fowl outwardly of and adjacent the vent with a rotating motion so as to produce a reaction force urging the area of the fowl adjacent the vent into engagement with the cutting means which causes a circular cut to be made in this area of the fowl surrounding the vent, thus releasing the vent from the surrounding tissue to thereby allow the vent to be removed and taken from the fowl when the entrails are later taken from the fowl in a succeeding step.

The present invention enables the vent of a fowl to be quickly and easily removed even by relatively inexperienced personnel and provides uniform satisfactory results.

DESCRIPTION OF THE PREFERRED EMBODIMENT

Figures 1, 2, 3:
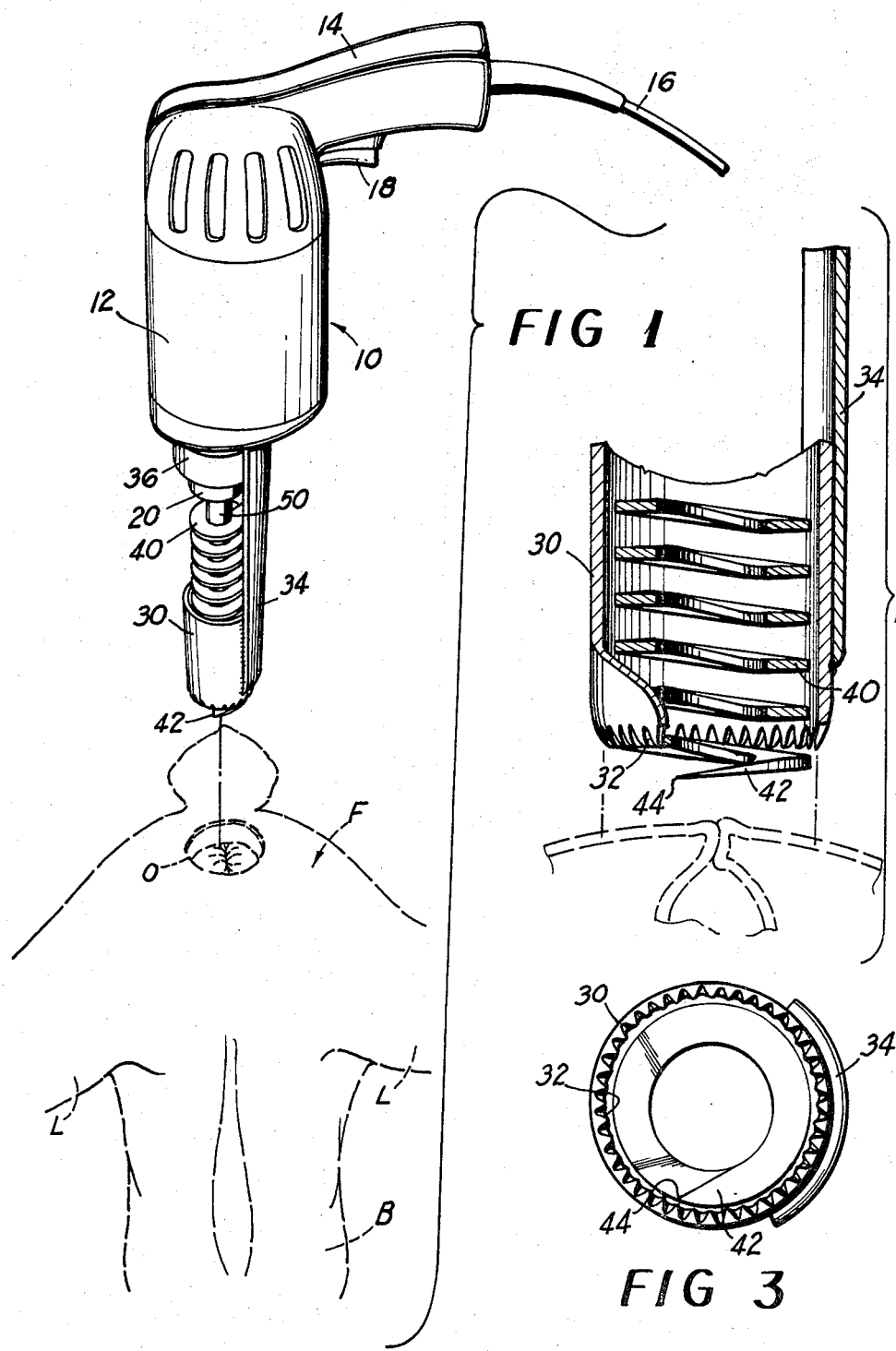
FIG. 1 is a top perspective view illustrating the apparatus of the present invention positioned adjacent a fowl.
FIG. 2 is a vertical section through the lower portion of the apparatus shown in FIG. 1.
FIG. 3 is a bottom view of the structure shown in FIG. 2.

Referring now to the drawings wherein like reference characters designate corresponding parts throughout the several views, as seen in FIG. 1, a fowl indicated generally by reference character F is supported in the position shown with the body portion B hanging downwardly and with the legs L thereof suitably suspended whereby access can be readily gained to the vent of the fowl. Reference character O indicates the opening formed in the fowl when the vent is removed utilizing the apparatus of the present invention.

As seen in the upper portion of FIG. 1, the operable support apparatus of the present invention includes an electric tool of conventional construction indicated generally by reference character 10 and including a casing 12 and a handle 14 from which extends a power cable 16. A conventional trigger 18 is provided for operating the tool and the usual chuck 20 is connected with the rotating shaft of the tool.

The cutting means comprises a tubular serrated cutting member 30 having an annular cutting edge 32 at the lower end thereof, this cutting edge is detailed in diameter to be slightly larger than the fowl vent and comprises a plurality of teeth disposed in a circular array.

The cutting member is rigidly attached as by welding or the like to a support member 34. This support member is connected at the upper end thereof to a circular clamp 36 which fits about a stationary collar on the drill and is suitably clamped thereto by conventional adjustable means (not shown).

A reaction means is provided in the form of an elongated spiral resilient member 40 formed of spring steel and the like. This spiral member includes a tapered lower outer end 42 terminating in a sharp point 44.

The upper end of spiral member 40 is rigidly secured as by welding or the like to a spindle 50 which in turn is secured to chuck 20 in a conventional manner for rotation with the chuck when the drill is operated.

When it is desired to remove the vent of the fowl, the fowl is supported in the position as shown in FIG. 1 and the drill is operated to cause rotation of the reaction member. The cutting member is disposed at the outer surface of the fowl surrounding the vent and the sharp tapered outer end of the reaction member penetrates into the skin of the fowl outwardly of the vent with a rotating motion to produce a reaction force which urges the area of the fowl surround the vent into engagement with the cutting means to make a circular cut around the vent to allow the vent to be removed.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. Apparatus for fowl vent removal comprising a tubular member having an annular cutting edge, reaction means comprising a flat strip coiled about the axis of said tubular member with the broad face of the strip substantially transverse to said axis, said reaction means comprising a portion lying within said tubular member and a portion extending outwardly beyond the cutting edge thereof, said outwardly extending portion terminating in a sharp tapered end, and means for rotating said reaction means about said axis.

2. Apparatus as in claim 1 wherein said reaction means has a diameter only slightly less than that of said tubular member.

3. Apparatus as in claim 1 wherein said tubular member is fixedly mounted and remains stationary while said reaction means rotates within it.

4. Apparatus as in claim 1 wherein said cutting edge is separated.

5. Apparatus as in claim 1 wherein said reaction means is formed of spring steel.

6. Apparatus as in claim 1 wherein said reaction means is mounted on a spindle adapted to be received by the chuck of a rotary tool.

7. Apparatus as in claim 1 wherein the tapered end of said reaction means is spaced outwardly from the axis of said tubular member and is positioned adjacent the cutting edge of that member.

* * * * *